April 21, 1942. J. DICKSON 2,280,385
BEARING
Filed Dec. 13, 1940
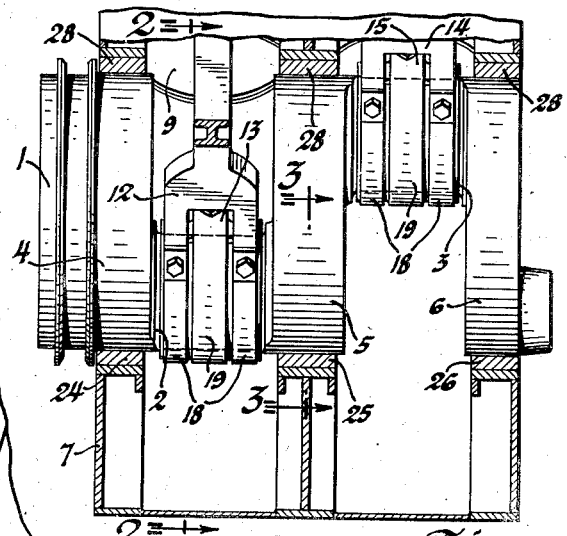
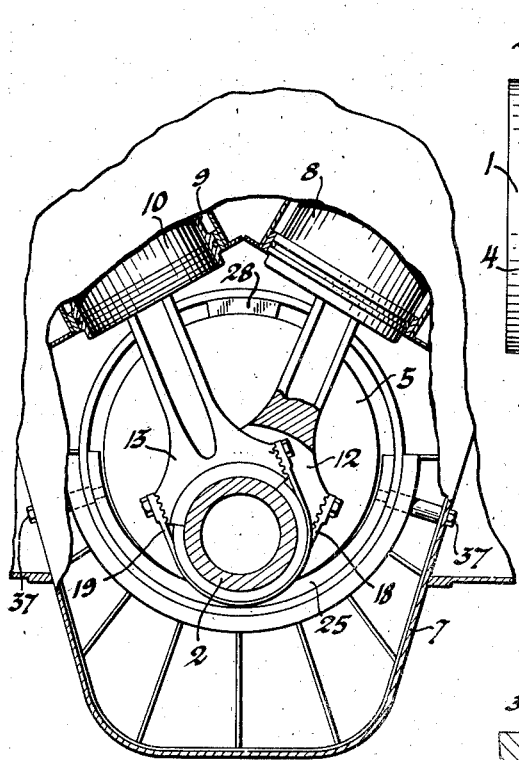
Fig. 2
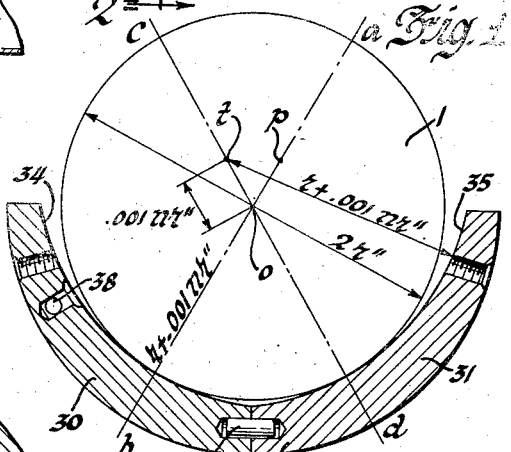
Fig. 3
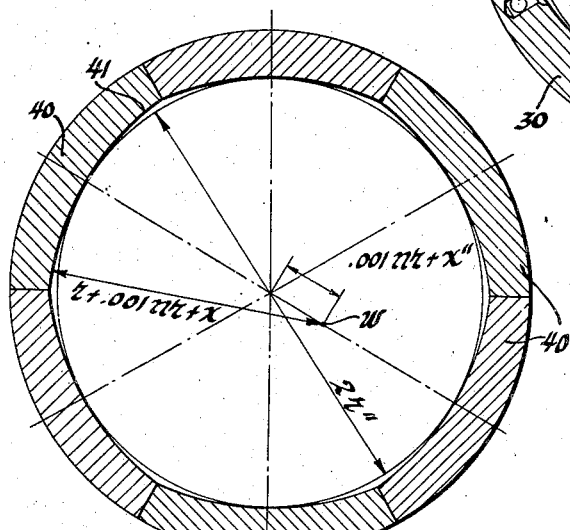
Fig. 4
Inventor
John Dickson
By Blackmore, Spencer & Flint
Attorneys Patented Apr. 21, 1942

2,280,385

UNITED STATES PATENT OFFICE 2,280,385

BEARING

John Dickson, Ferndale, Mich., assignor to General Motors Corporation, Detroit, Mich., a corporation of Delaware Application December 13, 1940, Serial No. 369,956

3 Claims. (Cl. 308—121)

This invention relates to bearings for revolving shafts. It relates to plain bearings, and especially to plain bearings for shafts having journals of relatively large diameter such that there is a high relative surface speed between the journals and the bearings in which they are supported.

More specifically it relates to the main bearings for an engine crankshaft of which the journals have a radius approximately equal to the radius of the crank throws, and constitute the crank cheeks or webs.

In conventional V-type engines particularly, the length of the engine is controlled, not by the cylinder center spacing in each bank of cylinders, but by the main bearing loads and the length of journal which is required to sustain them.

A reduction of as much as 33⅓% in the cylinder center spacing of a V-type engine can be effected by making the crank cheeks circular so that their cylindrical surfaces form the journals, which however, are necessarily two or three times greater in diameter than would be required for the requisite strength in the journals, and have a radius approximately equal to the radius of the crank throw.

Plain bearings for such journals have heretofore been unsatisfactory because of the high relative surface speed between the journals and their bearings, and the high frictional losses due to the increased length of the load supporting oil films between the surfaces, which have to be sheared.

The object of the invention is a plain bearing with spaced load supporting oil film areas which are of adequate dimensions to support the shaft loads, while being of minimum dimensions to reduce friction losses which are dependent on the extent of oil film which has to be sheared.

Another object of the invention is a plain bearing with at least two contiguous surfaces tangential to the shaft and at obtuse angles to each other, on which shaft loads are supported on spaced bearing areas, one on each of said surfaces.

A still further object of the invention is a plain bearing with spaced bearing areas into which lubricating oil is forced through tapered clearance spaces between the shaft and its bearing.

The above and other objects of the invention will be apparent as the description proceeds.

The drawing shows the application of the invention to a V-type two-cycle engine in which the loads on the crankshaft are in a generally downward direction, while the type of bearing according to the invention, which is suitable for a six cylinder radial engine with six cylinders disposed at 60° to each other, is also shown.

In the drawing:

Fig. 1 is a longitudinal, part sectional view of part of a four cylinder V-type, two-cycle engine, with crankshaft and main bearings according to the invention.

Fig. 2 is a part sectional view on line 2—2 of Fig. 1.

Fig. 3 is an enlarged part sectional view on line 3—3 of Fig. 1.

Fig. 4 is a view (similar to Fig. 3) of a main bearing for a six cylinder radial engine.

Referring now to Figs. 1 and 2, the engine crankshaft 1, has two crank pins 2 and 3 at 180° to each other, between main journals 4, 5 and 6, which are supported in bearings in the engine crankcase 7. The main journals have a radius approximately equal to the radius of the crank throws, and constitute the crank cheeks or webs. Since the main journals themselves are the crank webs, the space axially of the crankshaft normally taken up by the crank webs is saved.

There are two banks of two cylinders, disposed at 60° to each other, forming a V-type four cylinder engine. Cylinders 8 and 9 of opposite banks are disposed at 60° to each other in a plane normal to the crankshaft axis, and their pistons such as 10 are connected by fork and blade connecting rods 12 and 13 respectively, to the crankpin 2. Fork and blade connecting rods 14 and 15 respectively, connect the pistons of the remaining pair of cylinders of the opposite banks, to the crankpin 3.

Since the engine is a two cycle engine and there is no suction stroke, the cylinder gas pressures are at all times substantially super-atmospheric, and hence the connecting rods are virtually always in compression between their pistons and the crankpins, so that the loads on the crankshaft are always in the same, generally downward direction, and it is only necessary, for the sake of safety, to provide each of the fork connecting rods 12 and 14 with two keeper straps such as 18, and each of the blade connecting rods 13 and 15 with keeper straps such as 19, to form the lower half of the connecting rod big end bearings.

For the same reason it is only necessary to provide main bearing areas on the downward loaded side of the main bearings 24, 25 and 26 for the main journals 4, 5 and 6 respectively and to provide what only amount to keeper pieces such as 28 for the upper or top half of the main bearings.

As shown most clearly in Fig. 3, each main bearing such as 25 provides two contiguous arcuate surfaces tangential to the shaft and at obtuse angles to each other, on which the downward loads from said shaft are supported on spaced bearing areas, one on each of said surfaces.

Each of the bearings 24, 25 and 26 consists of two segments such as 30 and 31 preferably of a material which is hard and elastic, with low dry friction such as certain of the aluminum alloys, dowelled together by a dowel pin 33. The outer periphery of the segments is concentric with the center 0 of the shaft 1, but the inner arcuate surfaces 34 and 35 of both segments are tangential to the shaft at points on the lines $a$—$b$ and $c$—$d$ respectively, which are the center lines of the cylinders in the respective banks of cylinders, and they have a radius equal to the radius of the shaft $r$ plus a multiple $n$ times .001″ per inch of radius of the shaft, about centers $p$ and $t$ respectively. The value of the factor $n$ will depend on the magnitude of the load to be sustained. The segments such as 30, 31 are secured in position in the engine crankcase 7, by means of suitable bolts such as 37.

It will be seen that the generally downward loads from the shaft 1 are supported on spaced bearing areas, one on each of the arcuate surfaces 34 and 35, and that these surfaces have clearance from the shaft, progressively increasing away from their point of tangency to the shaft, and providing tapered clearance spaces through which lubricating oil to maintain an oil film over the bearing areas, and reaching the inner arcuate surfaces 34 and 35 through ducts such as 38, is forced by the rotation of the shaft.

The type of bearing shown in Fig. 3 is suitable for a turbine or any other constructions in which the bearing load is comparatively small and in one general direction, and torque and construction requirements necessitate a large diameter of shaft.

In general there are at least two contiguous tangential surfaces in a bearing according to the invention and there may be as many such surfaces as there are loads in different radial directions on the bearing.

In Fig. 4 for example, which shows a main bearing for a six cylinder radial engine having six cylinders spaced 60° apart from each other, there are six contiguous segments such as 40, with identical inner arcuate surfaces such as 41, tangential to the shaft, and comprising an arcuate sided regular polygon completely surrounding the shaft.

In this, and any other cases in which the shaft loads are generally outwards in all directions, necessitating bearing surfaces which completely surround the shaft, the inner arcuate surfaces of all the segments have a radius about centers such as $w$, equal to the radius of the shaft $r$, plus a multiple $n$ times .001″ per inch of radius of the shaft, plus $x$ the clearance over shaft diameter required to eliminate viscous friction as the load rotates.

While in the embodiments illustrated, the bearing consists of a plurality of segments, one for each of the arcuate surfaces, this is obviously not necessarily the case, since all the requisite surfaces could for example be broached in one bearing ring, if desired.

I claim:

1. In a V-type two-cycle engine having a crankshaft with circular crank cheeks of radius approximately equal to the radius of the crank throw, and forming the main journals of the crankshaft, the loads on said crankshaft being at an acute angle to each other in a generally downward direction, plain bearings for said main journals each consisting of but two surfaces, normal to said loads, tangential to the crankshaft and at obtuse angles to each other; said surfaces having clearance from said crankshaft progressively increasing away from their point of tangency thereto and providing tapered clearance spaces through which lubricating oil, to maintain oil film areas on said surfaces of adequate dimension to support the crankshaft loads while being of minimum dimension to reduce friction losses, is forced by the rotation of said crankshaft.

2. The combination according to claim 1 in which keeper pieces normally clear of said crankshaft are provided to retain the crankshaft on its bearings.

3. The combination according to claim 1 in which said surfaces are contiguous arcuate surfaces of radius equal to the radius of the journals plus a multiple of .001″ per inch of radius of the journals and the loads from said crankshaft are supported on spaced bearing areas, one on each of said surfaces.

JOHN DICKSON.